US008674878B2

(12) United States Patent  (10) Patent No.: US 8,674,878 B2
Wu et al.  (45) Date of Patent: Mar. 18, 2014

(54) SMART ANTENNA SYSTEM

(75) Inventors: Min-Chung Wu, Hsinchu County (TW); Shao-Chin Lo, Hsinchu County (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 131 days.

(21) Appl. No.: 13/026,296

(22) Filed: Feb. 14, 2011

(65) Prior Publication Data

US 2012/0062422 A1 Mar. 15, 2012

Related U.S. Application Data

(60) Provisional application No. 61/382,922, filed on Sep. 15, 2010, provisional application No. 61/422,660, filed on Dec. 14, 2010, provisional application No. 61/425,252, filed on Dec. 21, 2010.

(51) Int. Cl.
*H01Q 3/02* (2006.01)

(52) U.S. Cl.
USPC .......................................................... 342/374

(58) Field of Classification Search
USPC .......................................................... 342/374
See application file for complete search history.

(56) References Cited

U.S. PATENT DOCUMENTS

| | | | |
|---|---|---|---|
| 6,816,116 B2 | 11/2004 | Chen | |
| 6,879,296 B2 | 4/2005 | Jiang | |
| 7,280,073 B2 | 10/2007 | Sayers | |
| 2003/0038751 A1 | 2/2003 | Iwai | |
| 2003/0179138 A1* | 9/2003 | Chen | 342/372 |
| 2006/0022890 A1* | 2/2006 | Chiang et al. | 343/833 |
| 2006/0203789 A1* | 9/2006 | Iacono et al. | 370/338 |
| 2007/0049203 A1* | 3/2007 | Dillon et al. | 455/63.4 |
| 2007/0217526 A1* | 9/2007 | Park et al. | 375/260 |
| 2008/0246663 A1 | 10/2008 | Fox | |
| 2009/0054106 A1 | 2/2009 | Antolovic | |
| 2010/0069066 A1 | 3/2010 | Shen | |

FOREIGN PATENT DOCUMENTS

| | | |
|---|---|---|
| CN | 1452270 A | 10/2003 |
| CN | 1528101 A | 9/2004 |
| CN | 1260853 C | 6/2006 |
| CN | 1864344 A | 11/2006 |
| TW | 201019755 | 5/2010 |

OTHER PUBLICATIONS

Guterman et al., "Wrapped Microstrip Antennas for Laptop Computers", Aug. 2009, pp. 12-39, IEEE Antennas and Propagation Magazine, vol. 51, No. 4.

Yeap et al., "Integrated diversity antenna for laptop and PDA terminal in a MIMO system", Dec. 2005, pp. 495-504, vol. 152, No. 6, IEE Proc.-Microw. Antennas Propag.

He et al., "Analysis and Design of a Novel Dual-Band Array Antenna With a Low Profile for 2400/5800-MHz WLAN Systems", Feb. 2010, pp. 391-396, vol. 58, No. 2, IEEE Transactions on Antennas and Propagation.

(Continued)

*Primary Examiner* — Harry Liu
(74) *Attorney, Agent, or Firm* — Winston Hsu; Scott Margo (57) ABSTRACT

The present invention discloses a smart antenna system for a portable device. The smart antenna system includes a plurality of directional antennas, disposed at a plurality of positions of the portable device, having a plurality of directional radiation patterns corresponding to a plurality of areas; wherein all of the plurality of directional radiation patterns substantially form an omni directional radiation pattern.

12 Claims, 6 Drawing Sheets

(56) References Cited

OTHER PUBLICATIONS

Hong et al., "Dual-Path Dual-Polarized Antenna System for SDARS Application", Sep. 2006, pp. 1434-1437, Proceedings of the 36th European Microwave Conference, Manchester UK.

Wong et al., "Dual-Band Flat-Plate Antenna With a Shorted Parasitic Element for Laptop Applications", IEEE Transactions on Antennas and Propagation, vol. 53, No. 1, Jan. 2005, p. 539-544.

Liu et al., "Developing Integrated Antenna Subsystems for laptop computers", IBM J. Res. & Dev. vol. 47 No. 2/3 Mar./May 2003, p. 355-367.

* cited by examiner

SMART ANTENNA SYSTEM

CROSS REFERENCE TO RELATED APPLICATIONS

This application claims the benefits of U.S. Provisional Application No. 61/382,922, filed on Sep. 15, 2010 and entitled "SMART ANTENNA AND SYSTEM USING THE SAME", U.S. Provisional Application No. 61/422,660, filed on Dec. 14, 2010 and entitled "SMART ANTENNA SYSTEM", and U.S. Provisional Application No. 61/425,252, filed on Dec. 21, 2010 and entitled "PORTABLE DEVICE WITH SMART ANTENNA" the contents of which are incorporated herein by reference.

BACKGROUND OF THE INVENTION

1. Field of the Invention

The present invention relates to a smart antenna system, and more particularly, to a smart antenna system used in a portable device.

2. Description of the Prior Art

Antenna design is crucial to a portable device with wireless communication function, such as wireless local area network (WLAN) or other mobile communication system. In a conventional wireless communication device, one or a plurality of omni directional antennas are used to receive radio signals from all directions. Antenna diversity technique is also used to determine which one or more omni-directional antennas should be used to receive or transmit signals. However, the efficiency and gain of omni directional antennas are not good enough. Hence, there's a need for an antenna design that provides smarter and better receiving quality.

SUMMARY OF THE INVENTION

It is therefore an object of the present invention to provide a smart antenna system.

The present invention discloses a smart antenna system for a portable device. The smart antenna system includes a plurality of directional antennas, disposed at a plurality of positions of the portable device, having a plurality of directional radiation patterns corresponding to a plurality of areas; wherein all of the plurality of directional radiation patterns substantially form an omni directional radiation pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
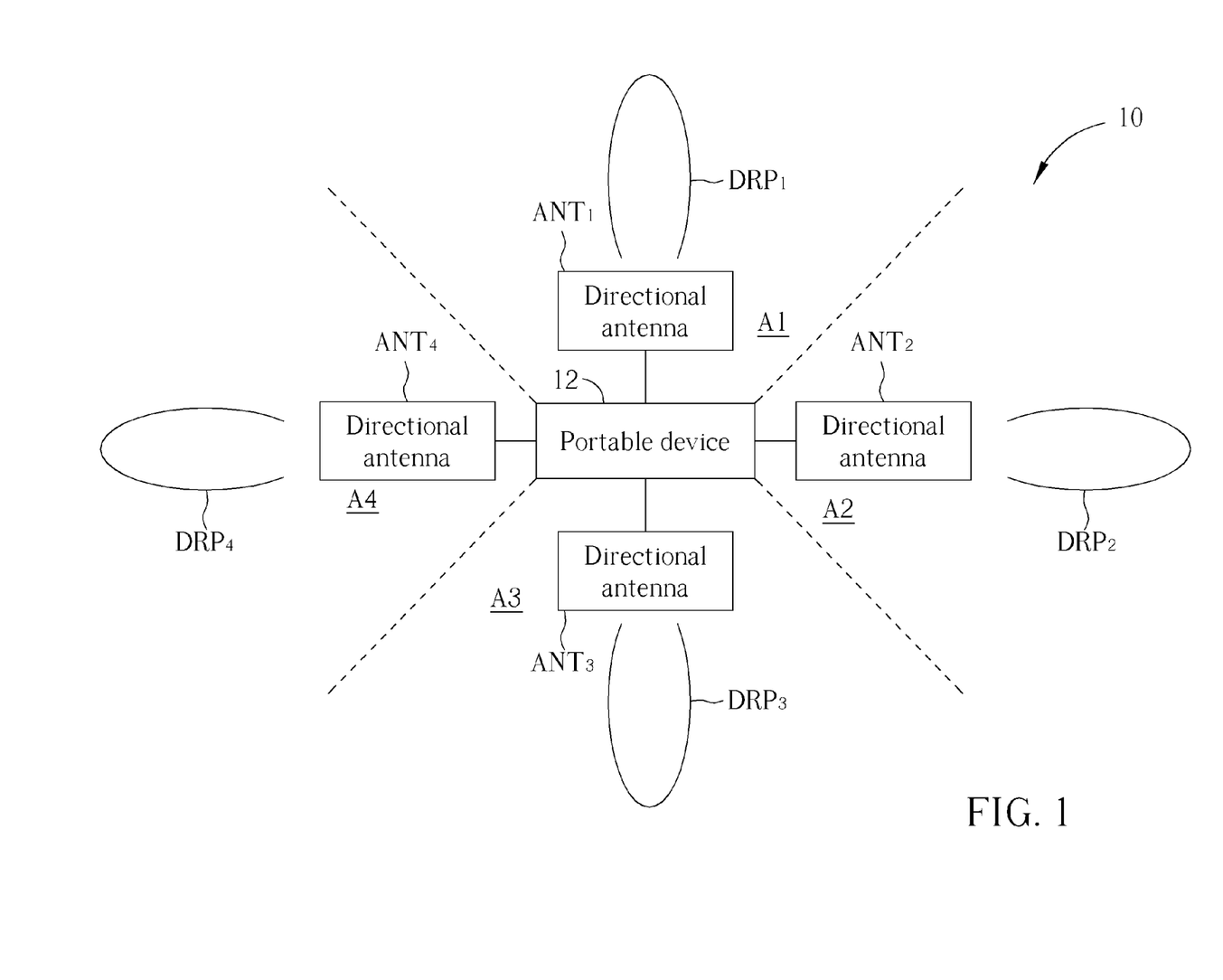
FIG. 1 is a schematic diagram of a smart antenna system according to an embodiment of the present invention.

Please refer to FIG. 1, which is a schematic diagram of a smart antenna system 10 according to an embodiment of the present invention. The smart antenna system 10 is utilized in a portable device 12. The smart antenna system 10 includes directional antennas $ANT_1$-$ANT_4$. The directional antennas $ANT_1$-$ANT_4$ are disposed at 4 positions of the portable device 12, e.g. a left side, a right side a bottom side and a top side around the portable device 12, and have directional radiation patterns $DRP_1$-$DRP_4$ corresponding to areas $A_1$-$A_4$. All of the directional radiation patterns $DRP_1$-$DRP_4$ substantially form an omni directional radiation pattern. Noticeably, an amount of directional antennas included in the smart antenna system 10 is not limited to any specific number, as long as radiation patterns thereof can substantially form an omni directional radiation pattern to receive and transmit signals from all directions.

Noticeably, compared with an omni directional antenna, an ordinary directional antenna has many advantages in a corresponding directional radiation pattern, such as high gain for desired signal, long transmission distance, better received signal strength indication (RSSI), low side lobe for interference, low noise floor, and low power consumption under the same Equivalent isotropically radiated power (EIRP) requirement, etc. Therefore, in such a configuration, the omni directional radiation pattern substantially formed by the directional radiation patterns $DRP_1$-$DRP_4$ has better efficiency than an omni directional radiation pattern formed by one or a plurality of omni directional antennas. As a result, the smart antenna system 10 can have better gain and efficiency.

In a preferable case, no directional antenna of the directional antennas $ANT_1$-$ANT_4$ has a directional radiation pattern directing toward a user of the portable device 12, and signals from a direction of the user can be received by the directional antennas $ANT_1$-$ANT_4$ through multi-path, e.g. reflection by objects, such that the user may not be harmed by radiation. For example, the directional antennas $ANT_1$-$ANT_4$ shown in FIG. 1 can be disposed on sides around a display of the portable device 12, and another directional antenna $ANT_5$ (not shown) can further be disposed on a back side of the display of the portable device 12, such that the user can operate the portable device 12 without being harmed by radiation.

Figure 2:
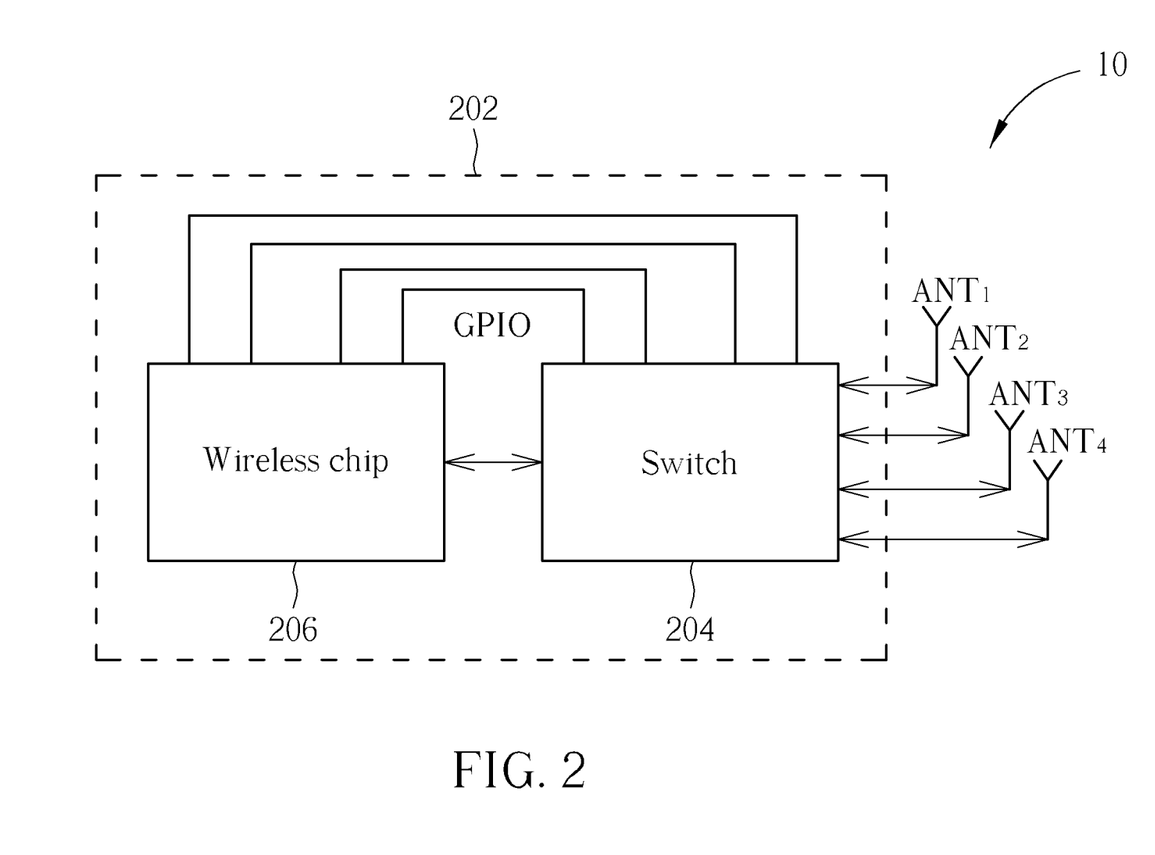
FIG. 2 is a schematic diagram of the smart antenna system shown in FIG. 1 according to an alteration of the present invention.

On the other hand, please refer to FIG. 2, which is a schematic diagram of the smart antenna system 10 shown in FIG. 1 according to an alteration of the present invention. In order to enhance efficiency in wireless transmission, the smart antenna system 10 can further include a wireless module 202, for switching to utilize one of the directional antennas $ANT_1$-$ANT_4$ to receive and transmit signals at a time. Therefore, the smart antenna system 10 can preferably only utilize a directional antenna with a best efficiency among the directional antennas $ANT_1$-$ANT_4$ to receive and transmit signals and thus save power, wherein the directional antenna with the best efficiency is a directional antenna having a directional radiation pattern corresponding to an area where a signal source is located.

In detail, the wireless module 202 includes a switch 204 and a wireless chip 206. The switch 204 can be a single pole four throw (SPOT) switch or a SPnT in other cases. The wireless chip 206 is coupled to the switch 204, and controls the switch 204 to connect with one of the directional antennas $ANT_1$-$ANT_4$ through General Purpose Input/Output (GPIO) interfaces or other interfaces. As a result, the wireless chip 206 can preferably control the switch 204 to connect to the directional antenna with the best efficiency among the directional antennas $ANT_1$-$ANT_4$ according to a location of a signal source, so as to utilize the directional antenna with the best efficiency to receive and transmit signals at a time.

Figure 3A:
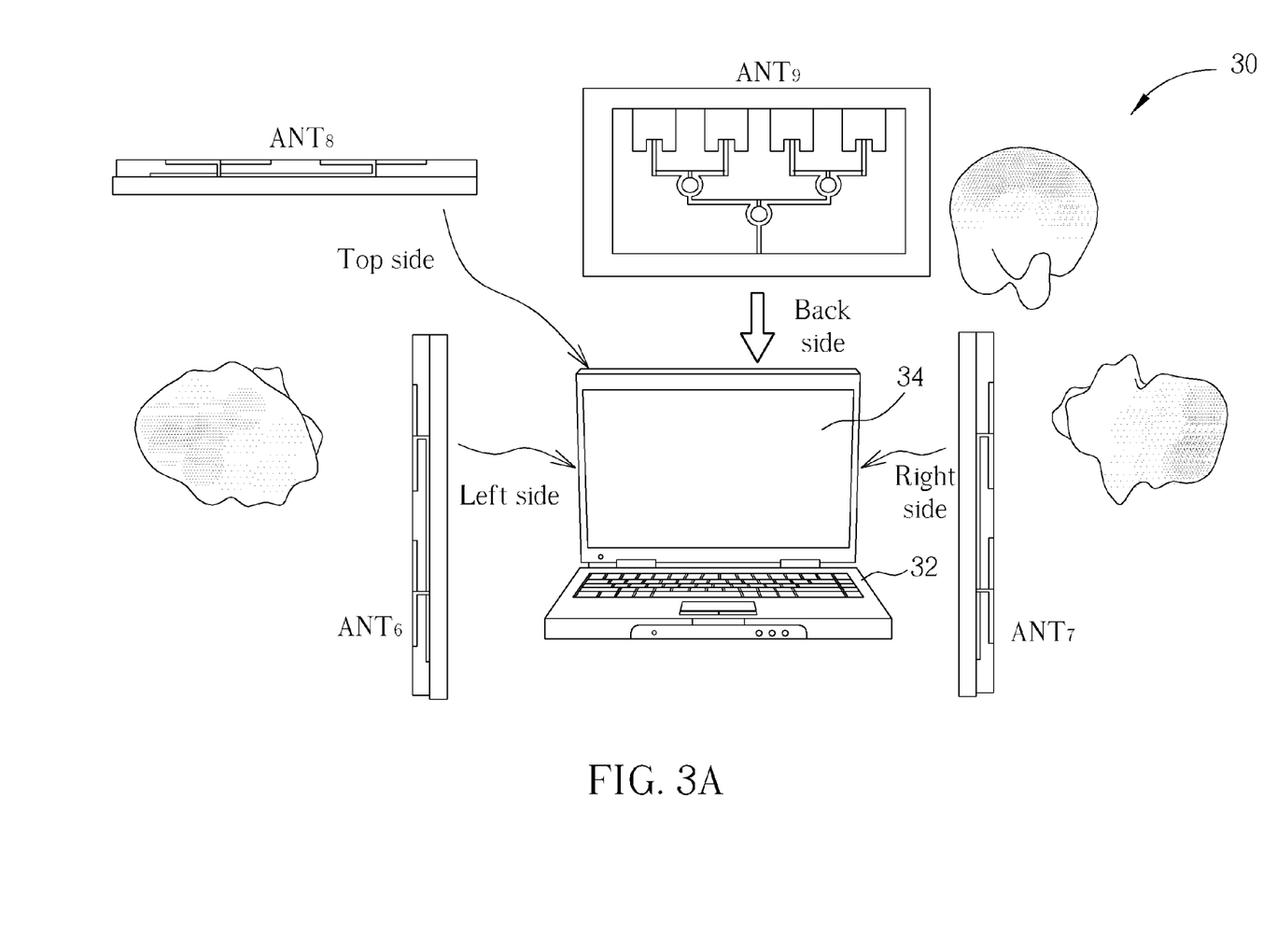
FIG. 3A is a schematic diagram of a smart antenna system utilized in a laptop according to an embodiment of the present invention.

Take a laptop for example, please refer to FIG. 3A, which is a schematic diagram of a smart antenna system 30 utilized in a laptop 32 according to an embodiment of the present invention. As shown in FIG. 3A, directional antennas $ANT_6$-$ANT_8$ are disposed on a left side, a right side and a top side of a display 34 of the laptop 32, respectively, and another directional antenna $ANT_9$ is disposed on a back side of the display 34 of the portable device 32. The directional antenna $ANT_9$ can be a parallel patch array antenna since a space between a frame and the back side of the display 34 is very thin, and may have the highest efficiency, such as a maximum antenna gain of 7 dB, while the directional antennas $ANT_6$-$ANT_8$ can be series dipole array antennas since spaces between a frame and the left side, the right side and the top side of the display 34 are very narrow, and may have an antenna gain of 5 dB.

Noticeably, no directional antenna has a directional radiation pattern directing toward a user of the laptop 32, and thus the user should not be harmed by radiation. In such a configuration, when the smart antenna system 30 determines the directional antenna $ANT_9$ with the best efficiency, i.e. a signal source is located in an area corresponding to the directional antenna $ANT_9$, the smart antenna system 30 switches to the smart antenna system 30 to receive and transmit signals.

Figure 3B:
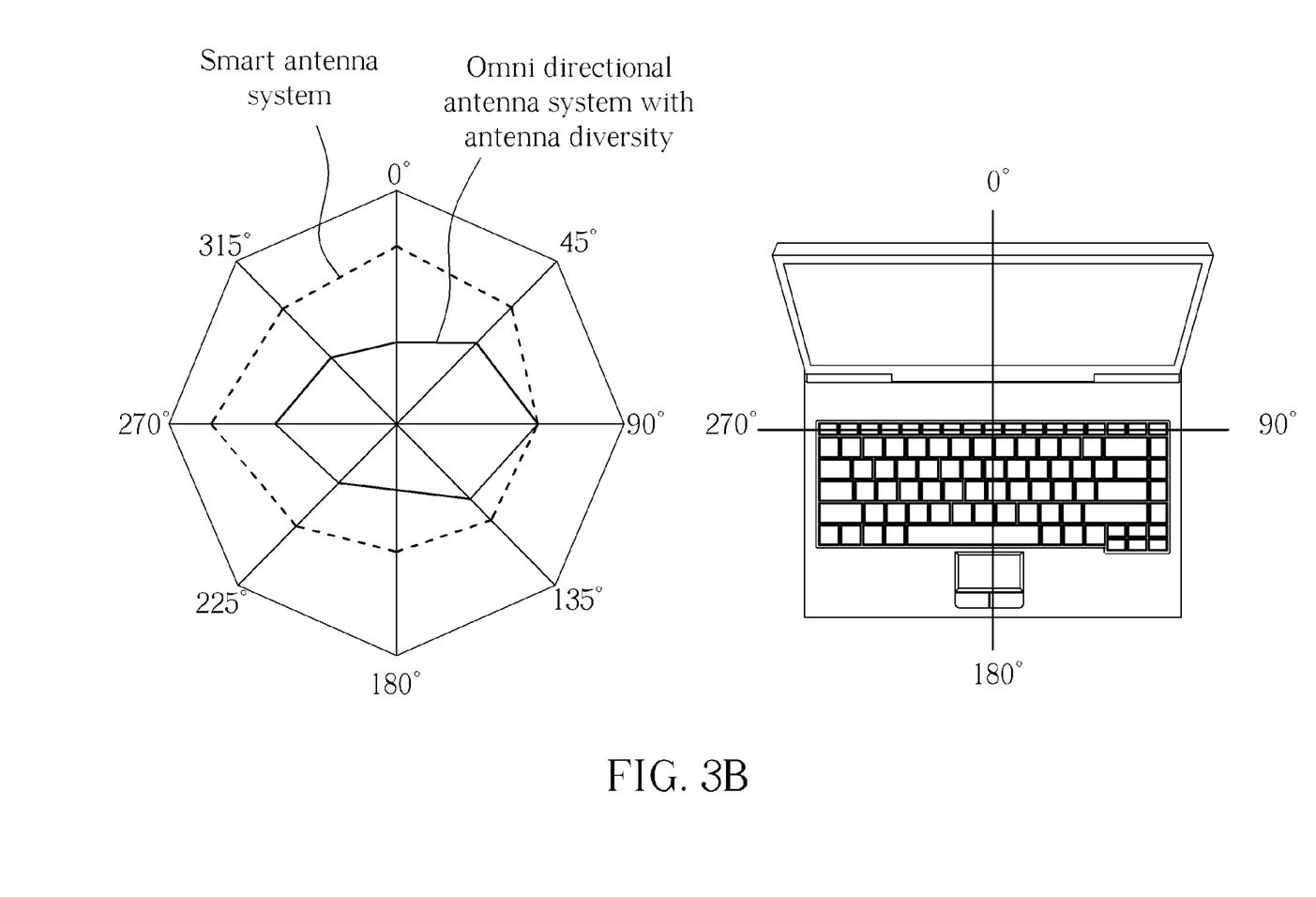
FIG. 3B is a schematic diagram of efficiencies of a conventional omni directional antenna system with antenna diversity and the smart antenna system shown in FIG. 3A according to an embodiment of the present invention.

As a result, please refer to FIG. 3B, which is a schematic diagram of efficiencies of a conventional omni directional antenna system with antenna diversity and the smart antenna system 30 shown in FIG. 3A according to an embodiment of the present invention. FIG. 3B is obtained by setting the omni directional antenna system and the smart antenna system 30 on a turn table and transmitting signals to the omni directional antenna system and the smart antenna system 30 with 30 dB attenuation by a fixed signal source to measure throughputs while the omni directional antenna system and the smart antenna system 30 are turned by 360°, respectively. Noticeably, FIG. 3B is an experimental result, and the experimental result is distorted since the smart antenna system 30 in experiments has a narrower space on the right side)(90° than that on the left side)(270°. Ideally, throughput on the left side should be identical to that on the right side.

Figure 3C:
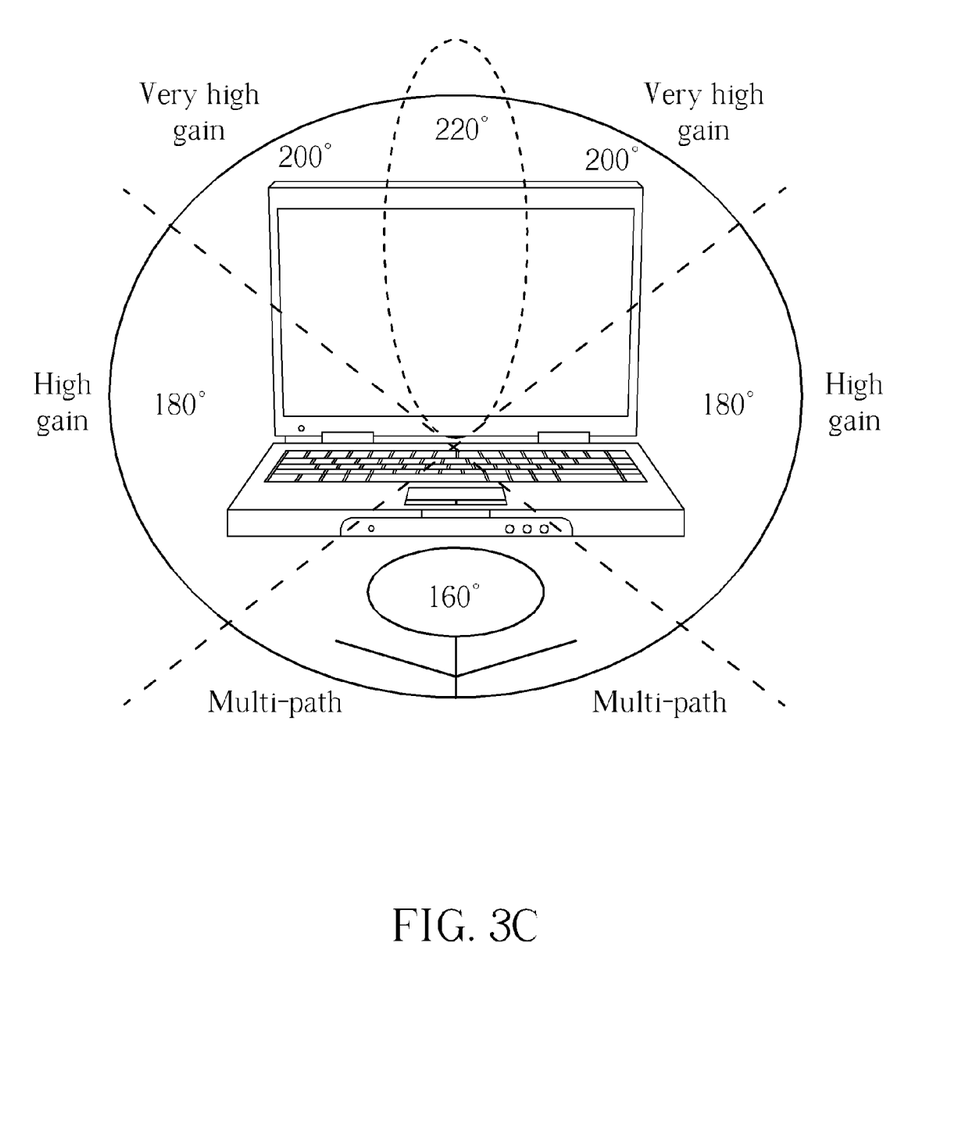
FIG. 3C is a schematic diagram of ideal gain improvement of the smart antenna system shown in FIG. 3B according to an embodiment of the present invention.

Please refer to FIG. 3C, which is a schematic diagram of ideal gain improvement of the smart antenna system 30 shown in FIG. 3B according to an embodiment of the present invention. In FIG. 3C, the directional antenna $ANT_9$ has highest antenna gain and thus highest gain improvement. Noticeably, though no directional antenna has a directional radiation pattern directing toward the user, signal gain of a direction corresponding to the user can still be improved due to multipath reception. As shown in FIG. 3B and FIG. 3C, the smart antenna system 30 can have better receiving and transmitting efficiency than the omni directional antenna system.

Noticeably, the spirit of the present invention is to arrange a plurality of directional antennas around a portable device, so as to substantially form an omni directional radiation pattern. Those skilled in the art shout make modifications or alterations accordingly. For example, the portable device 12 is preferably a laptop, but can be a tablet computer, a mobile phone etc.

Furthermore, a movement of the portable device 12 may be a factor to trigger a switching mechanism of the wireless chip 206 to determine which directional antenna has a best efficiency among the directional antennas $ANT_1$-$ANT_4$ and control the switch 204 correspondingly since corresponding areas of the directional antennas $ANT_1$-$ANT_4$ are changed.

In detail, since the directional antennas $ANT_1$-$ANT_4$ are directional, the change of RSSI at each antenna may be used to simulate or estimate the movement of the portable device 12. For example, a steady RSSI may imply the portable device 12 is at a steady state, which does not need to switch the currently used directional antenna. On the contrary, the wireless chip 206 starts determining which directional antenna has the best efficiency among the directional antennas $ANT_1$-$ANT_4$ if an RSSI of a currently connected antenna varies beyond a threshold X dBm, so as to control the switch 204 correspondingly.

Specifically, the wireless chip 206 controls the switch 204 to connect with each of the directional antennas $ANT_1$-$ANT_4$ for a predefined time t to collect a statistical information of the each of the directional antennas $ANT_1$-$ANT_4$, and determines which directional antenna has the best efficiency according to all statistical information of the directional antennas $ANT_1$-$ANT_4$. The statistical information may include at least one of an average RSSI, a packet error rate (PER), and a total successful packet number during a period. Besides, since the directional antenna has the best efficiency may not perform best in all of the average RSSI, the PER, and the total successful packet number due to non-ideal factors, the wireless chip 206 determines which directional antenna has the best efficiency according to a weighting W of the average RSSI, the PER, and the total successful packet number during a period. Noticeably, the threshold X, the predefined time t and the weighting W have to be adjusted due to practical requirement. As a result, the wireless chip 206 can control the switch 204 to connect to the directional antenna with the best efficiency when the portable device 12 moves.

Moreover, the wireless chip 206 can determine which directional antenna has a best efficiency among the directional antennas $ANT_1$-$ANT_4$ periodically, every predetermined time T, since a currently used directional antenna may not be a directional antenna actually having the best efficiency, e.g. there may be obstruction between a signal source and the directional antenna actually having the best efficiency during determination. As a result, the wireless chip 206 can determine which directional antenna has a best efficiency among the directional antennas $ANT_1$-$ANT_4$ periodically, to ensure the currently used directional antenna actually has the best efficiency.

Figure 4:
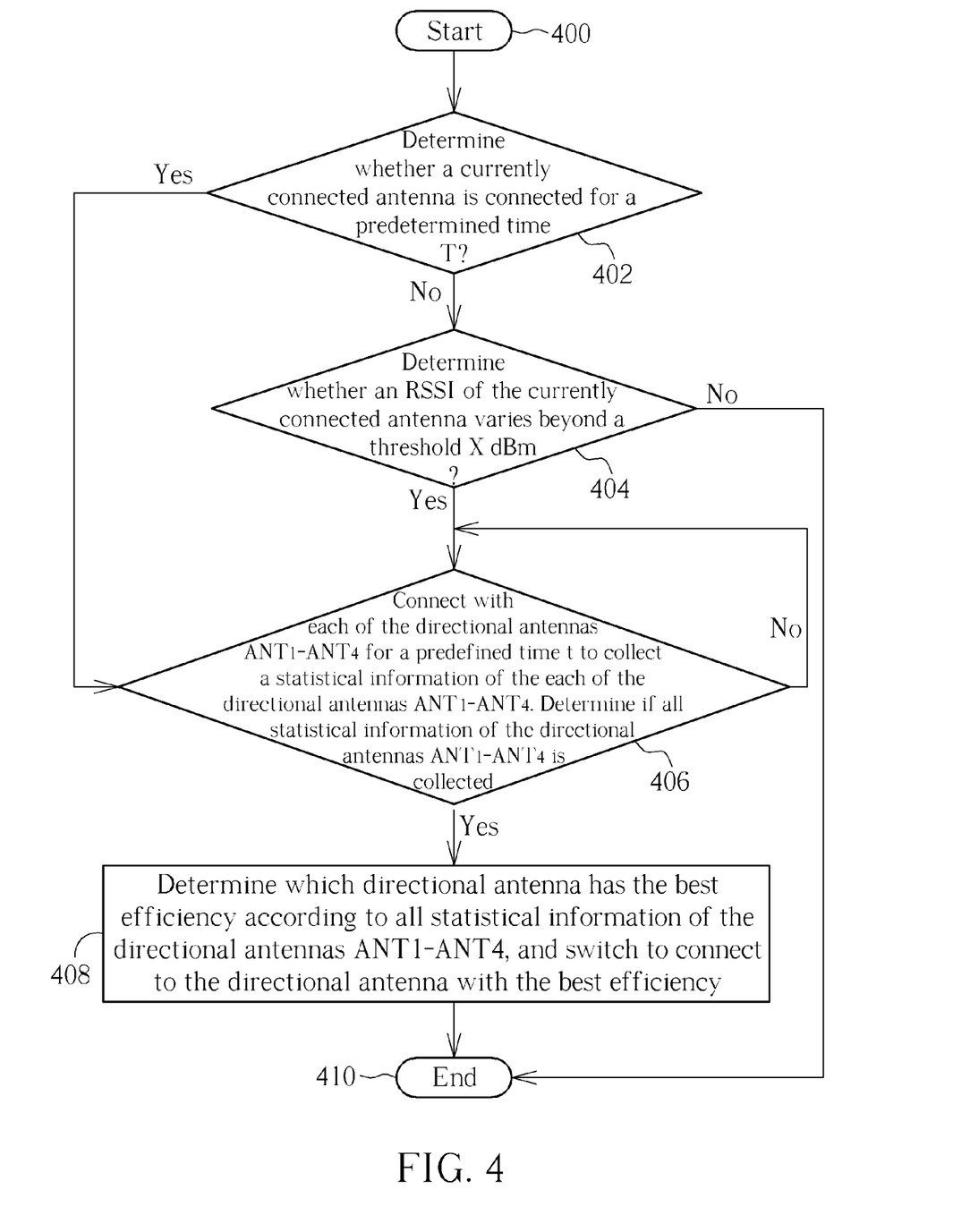
FIG. 4 is a switching process according to an embodiment of the present invention.

Operations of the wireless module 202 can be summarized into a switching process 40 as shown in FIG. 4. The switching process 40 includes the following steps:

Step 400: Start.

Step 402: Determine whether a currently connected antenna is connected for a predetermined time T. If yes, go to step 406; otherwise, go to step 404.

Step 404: Determine whether an RSSI of the currently connected antenna varies beyond a threshold X dBm. If yes, go to step 406; otherwise, go to step 410.

Step 406: Connect with each of the directional antennas $ANT_1$-$ANT_4$ for a predefined time t to collect a statistical information of the each of the directional antennas $ANT_1$-$ANT_4$. Determine if all statistical information of the directional antennas $ANT_1$-$ANT_4$ is collected. If yes, go to step 408; otherwise, go to step 406.

Step 408: Determine which directional antenna has the best efficiency according to all statistical information of the directional antennas $ANT_1$-$ANT_4$, and switch to connect to the directional antenna with the best efficiency.

Step 410: End.

Detailed operations of the switching process 40 can be derived by referring to the above description.

In the prior art, efficiency and gain of omni directional antennas are not good enough. In comparison, the present invention arranges a plurality of directional antennas around a portable device, so as to substantially form an omni directional radiation pattern, and thus have better gain and efficiency. Moreover, the present invention can determine which directional antenna has the best efficiency when the portable device moves or periodically, so as to ensure a currently used directional antenna has the best efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart antenna system for a portable device, comprising:
 a plurality of directional antennas, disposed at a plurality of positions of the portable device, having a plurality of directional radiation patterns corresponding to a plurality of areas, and the plurality of directional antennas measuring throughputs while the plurality of directional antennas are turned by 360°;
 a switch for switching a connection between a wireless module and at least one of the plurality of directional antennas; and
 a wireless chip, coupled to the switch, for controlling the switch to connect with one of the plurality of directional antennas;
 wherein all of the plurality of directional radiation patterns substantially form an omni directional radiation pattern, and the wireless chip determines which directional antenna has the best efficiency among the plurality of directional antennas periodically.

2. The smart antenna system of claim 1, wherein no directional antenna of the plurality of directional antennas has a directional radiation pattern directing toward a user of the portable device.

3. The smart antenna system of claim 1, wherein some directional antennas of the plurality of directional antennas are disposed on sides around a display of the portable device, and another directional antenna of the plurality of directional antennas is disposed on a back side of the display of the portable device.

4. The smart antenna system of claim 3, wherein the portable device is a laptop, and the some directional antennas of the plurality of directional antennas are disposed on a left side, a right side and a top side of a display of the laptop, respectively.

5. The smart antenna system of claim 1, wherein the wireless chip controls the switch to connect to a directional antenna with a best efficiency among the plurality of directional antennas.

6. The smart antenna system of claim 1, wherein the wireless chip determines which directional antenna has a best efficiency among the plurality of directional antennas.

7. The smart antenna system of claim 6, wherein the wireless chip determines which directional antenna has the best efficiency among the plurality of directional antennas if a received signal strength indicator (RSSI) of a currently connected antenna varies beyond a threshold.

8. The smart antenna system of claim 6, wherein the wireless chip controls the switch to connect with each of the plurality of directional antennas for a predefined time to collect a statistical information of the each of the plurality of directional antennas, and determines which directional antenna has the best efficiency according to all statistical information of the plurality of directional antennas.

9. The smart antenna system of claim 8, wherein the statistical information comprises at least one of an average RSSI, a packet error rate (PER), and a total successful packet number during a period.

10. The smart antenna system of claim 9, wherein the wireless chip determines which directional antenna has the best efficiency according to a weighting of the average RSSI, the PER, and the total successful packet number.

11. A method for operating a portable device comprising a wireless module and a plurality of antennas, the method comprising
 collecting a plurality of statistical information of the plurality of antennas and measuring throughputs while the plurality of antennas are turned by 360°; and
 connecting the wireless module to an antenna of the plurality antennas with a best efficiency according to the statistical information periodically.

12. The method of claim 11, wherein the statistical information is received signal strength indicator (RSSI).

* * * * *